United States Patent Office 3,292,298
Patented Dec. 20, 1966

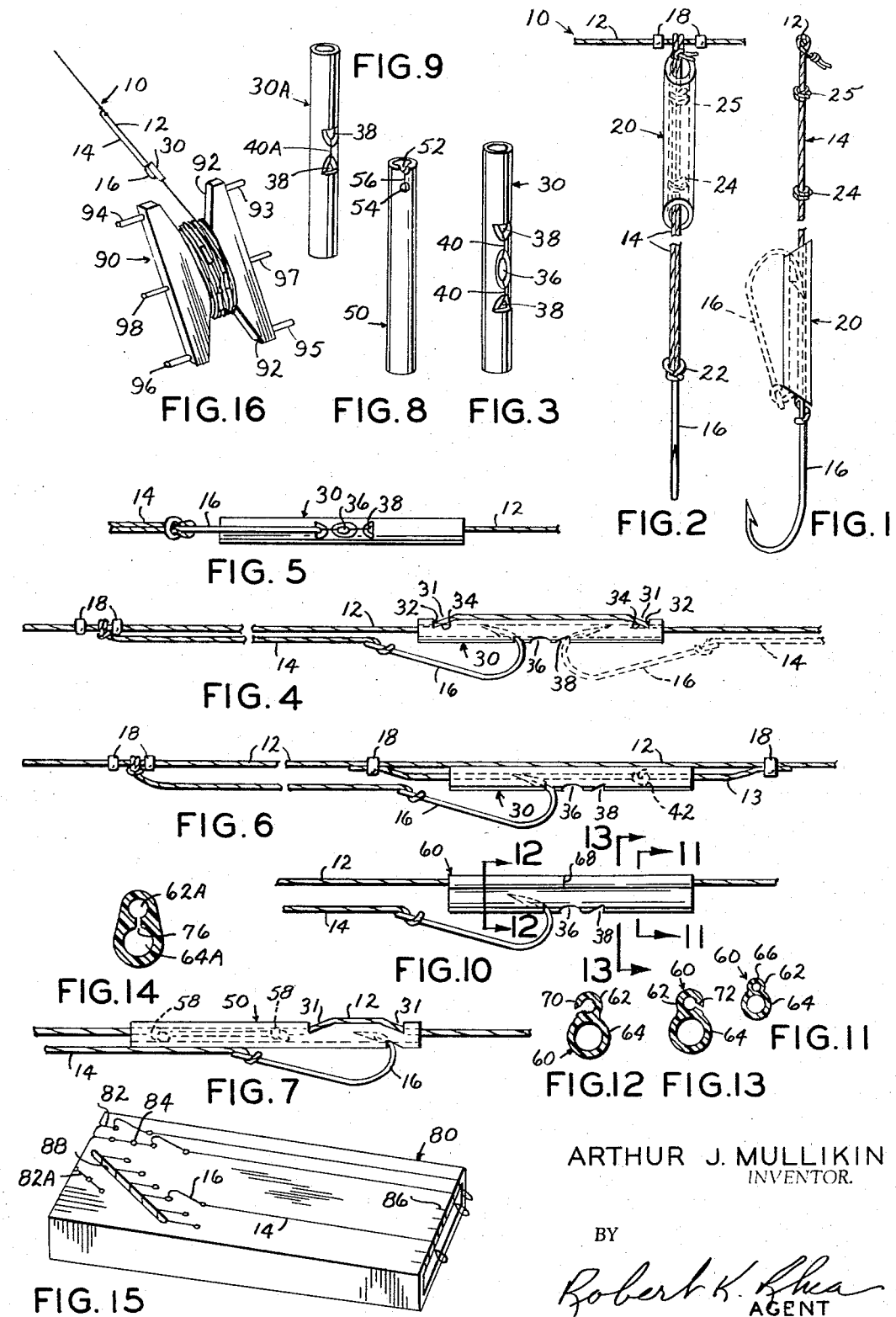

3,292,298
FISHHOOK GUARD AND LEADER ALIGNING DEVICE
Arthur J. Mullikin, 610 Cravens Bldg.,
Oklahoma City, Okla. 73101
Filed Oct. 12, 1964, Ser. No. 403,117
4 Claims. (Cl. 43—43.15)

The present invention relates to angling and more particularly to a fishhook guard.

It is desirable when fishing with a trotline that some means be provided for guarding or "disarming" the barbs of the plurality of fishhooks attached by a like plurality of leaders to the trotline so that the user will not be injured by the barbs of the fishhook when setting or stringing the trotline and when reeling in the trotline. It is also desirable that a means be provided for aligning the leaders and fishhooks parallel to and adjacent the trotline when winding up or unwinding the trotline so that the trotline, leaders and fishhooks do not become entangled.

It is, therefore, the principal object of this invention to provide a guard, which is supported by the fishing line, or the leaders attached thereto, which removably receives and nests the barbed portion of fishhooks, thereon.

A similarly important object is to provide a fishhook guard which is frictionally adjustable longitudinally of the fishing line so that the leader, attaching the fishhook to the fishing line, will be aligned with the latter when the guard is in fishhook barb disarming position.

Another object is to provide a fishhook guard which does not materially add to the weight and bulkiness of a trotline when wound on a holder or reel.

Another object is to provide a fishhook guard for trotlines, or the like, which permits the trotline to be wound on or unwound from a holder sustantially as easily as winding and unwinding a single fishing line.

Still another object is to provide a trotline fishhook guard which will act as a float for the line until such time as the fishhooks have been baited.

The present invention accomplishes these and other objects by placing a guard formed by a tube of pliable plastic material around the trotline or leaders and forming openings in the tube for frictional engagement with the trotline and removably receiving the barbed portion of the fishhook.

Other objects will be apparent from the following description when taken in conjunction with the accompanying single sheet of drawings, wherein:

FIGURE 1 is an elevational view of the guard installed on a trotline leader and illustrating, by dotted lines, the fishhook in barb guarded position;

FIGURE 2 is a left side view of FIG. 1 illustrating the guard moved to a float forming position;

FIGURE 3 is a perspective view of a preferred form of the guard;

FIGURE 4 is a fragmentary side elevational view of a trotline with the guard shown by FIG. 3 in fishhook barb nesting position;

FIGURE 5 is a top view of FIG. 4;

FIGURE 6 is a view similar to FIG. 4 illustrating an alternate manner of attaching the guard to the trotline;

FIGURE 7 illustrates still another manner of attaching the guard to a trotline wherein the guard forms a float;

FIGURES 8 and 9 are perspective views of alternative embodiments of the guard;

FIGURE 10 is a side elevational view of an alternative embodiment of the guard in operative position;

FIGURES 11, 12 and 13, are vertical cross-sectional views taken substantially along lines 11—11, 12—12 and 13—13 of FIG. 10;

FIGURE 14 is a view similar to FIG. 11 illustrating an alternative manner of forming the guard shown by FIG. 10;

FIGURE 15 is another alternative embodiment of the guard; and,

FIGURE 16 is a perspective view illustrating a trotline partially wound on a preferred form of trotline reel.

Like characters of reference designate like parts in those figures of the drawings in which they occur.

In the drawings:

The reference numeral 10 indicates a trotline, as a whole, comprising a main line or cord 12 having a plurality of attached leaders 14 each provided with a fishhook 16. The leaders 14 are formed of a single strand of fish line doubled back upon itself and connected in a conventional manner by its free end portions to the cord 12 between line clamps 18.

Referring more particularly to FIGS. 1 and 2, the numeral 20 indicates a guard, as a whole, comprising a relatively short section of casing or tube shown circular but any desired cross-sectional shape may be used. The guard 20 is preferably formed of pliable plastic material impervious to water. The length of the guard 20 is preferably at least as great as the length of the fishhook 16. The inside diameter of the guard 20 is substantially greater than the combined diameters of the two strands of the leader 14 but sufficiently small so that the closed loop end or eye 22 of the fishhook will not enter the guard 20 and will support the latter when the guard is positioned at the depending end portion of the leader. The respective ends of the guard 20 are cooperatively cut to define planes angularly disposed with respect to the longitudinal axis of the guard so that longitudinally a portion of the guard side wall is substantially less than a diametrically opposite longitudinal portion of the side wall. Thus when the barbed end portion of the fishhook 16 is inserted into the end portion of the guard opposite its end in contact with the fishhook eye 22, as shown by dotted lines (FIG. 1), the guard 20 will rotate around the leader 14 so that the shorter side wall portion of the guard is disposed adjacent the fishhook. A pair of single knots 24 and 25 are tied in the leader 14 in spaced-apart relation adjacent the cord 12. The spacing between the knots 24 and 25 is slightly less than the longitudinal length of the shorter side wall portion of the guard 20. When the fishhook 16 has been disarmed by removing the barbed end portion from the guard 20 the latter is manually moved toward the cord 12. Since this action usually takes place within the body of water, not shown, to be fished the leader 14 is wet. The relationship between the inside diameter of the guard 20 and the outside diameter of the knots 24 and 25 is such that a tight fit is formed between the inner periphery of the guard 20 and the outside diameter of the knots 24 and 25 when the guard is forced over the knots as shown in FIG. 2. The movement of the guard 20 across the knot 24 forms a swabbing action to clean the guard of any water contained therein and, when its upper end portion, as seen in FIG. 2, is positioned over the knot 25 air is trapped within the guard thus forming a float. The guard 20 is repositioned to form a fishhook guard by simply manually moving the guard to the fishhook connected end portion of the leader.

Referring now to FIGS. 3, 4, 5 and 6, the numeral 30 indicates a preferred form of the guard comprising a similar tube having parallel end edges normal to its longitudinal axis. The guard 30 is provided with a notch 31 through its wall adjacent its respective ends in longitudinal aligned relation. The notches are substantially V-shaped and are defined by a shoulder 32 normal to the longitudinal axis of the guard and intersected by an angular surface 34 which slopes toward the central portion of the guard. The cord 12 is threaded through one open end of the guard 30 then outwardly of the guard through one of the notches 31 and reinserted into the guard through the other notch and out through the open end of the guard opposite the first mentioned end. Thus, the guard 30 may be manually moved longitudinally of the cord 12 and the frictional resistance of the cord 12 binding on the wall surfaces forming the notches 31 maintains the guard in a selected position on the cord. Positioning the cord 12 outwardly of the guard 30 has the further advantage of preventing damage to the cord 12 by the barb. Medially its ends the wall of the guard 30 is provided with an ovate shaped opening 36. The size of the opening 36 is such that the barbed portion of the fishhook 16 may be easily inserted therethrough. Similar substantially V-shaped notches 38 are formed, in longitudinal aligned relation, in the guard wall adjacent the opposing end portions of the ovate shaped opening 36. The size of the notches 38 is preferably such that the opening formed thereby snugly receives the diameter of the arcuate portion of the fishhook between the barb and shank portion when placed therein. The notches 38 may be termed "fishhook locks." A slit or cut, indicated by the lines 40, forms a path of communication between the opening 36 and locks 38. The barbed end of the fishhook is inserted through the ovate opening 36 and the arcuate end portion of the fishhook is then manually pulled between the wall edges of the guard defining the slit or cut 40 so that the arcuately curved portion of the fishhook, btween the barb and the shank, is frictionally held by the lock 38. Obviously the guard 30 must be held by the other hand or the fisherman when disarming the fishhook. The guard 30 is then manually moved along the cord 12 in a direction opposite the connection of the leader 14 with the cord until the leader is positioned parallel to the cord. As mentioned hereinabove the frictional resistance offered to the guard by the cord maintains the guard in its selected position on the cord. The fishhook is removed from the guard by reversing the above described fishhook inserting action. The purpose of providing two fishhook locks 38 on the guard 30 is so that a fishhook may be inserted into the guard from either direction. Furthermore, this provides a fishhook lock for a second or adjacent fishhook and leader as is indicated by dotted lines (FIG. 4).

As shown in FIG. 6, the guard 30 may be secured to the cord 12 by a short length of similar cord 13 which extends through the guard 30 and is connected at its respective end portions to the cord 12 by clamps 18 or tying. A single knot 42 is tied in the cord 13 so that frictional resistance offered to the guard by the knot will maintain the leader of the connected fishhook taut.

FIGURES 7 and 8 illustrate another satisfactory manner of forming a fishhook lock and securing a fishhook guard or tube 50 to the cord. As shown in FIG. 8, a small notch 52 is cut in the end wall surface of the guard 50. A small circular aperture forming a fishhook lock 54 is then cut through the wall of the guard in selected spaced relation and in longitudinal alignment with the notch 52. The notch 52 and aperture 54 is similarly joined by a slit or slot indicated by the line 56. The barbed end of the fishhook 16 is manually inserted into the open end of the guard 50, having the notch 52, and the arcuate portion of the fishhook is similarly pulled through the slit 56 where it is held by the aperture 54. As seen in FIG. 7 the guard 50 is similarly provided with cord receiving substantially V-shaped notches 31 but the notches are positioned in spaced relation adjacent one end portion of the guard 50 rather than adjacent its opposing ends. The cord 12 is similarly entrained through the notches 31. The longer imperforate end portion of the guard 50, opposite the notch 52 is frictionally held in a selected position on the cord by a pair of spaced-apart single knots 58 tied in the cord and surrounded by the guard. The guard 50, when used in this manner, also forms a float.

It is important that the arcuate portion of the fishhook 16 be positioned against a wall of the guard, forming the fishhook lock, which is normal to the longitudinal axis of the guard, or be positioned within a circular aperture such as the aperture 54. This will prevent a tearing or ripping action of the fishhook into the material forming the guard. The ovate barb receiving opening 36 of the guard 30 may be omitted, as shown in FIG. 9, wherein the tube 30A is provided with opposing relatively closely spaced fishhook locks 38 similarly joined by a slit indicated by the line 40A. In this embodiment the fishhook barb is inserted into one of the locks 38 and then pulled into the opposite lock through the slit 40A to position the arcuate portion of the fishhooks against the wall of the notch which is normal to the longitudinal axis of the guard.

Referring now more particularly to FIGS. 10 to 13, inclusive, a fishhook guard, indicated by the numeral 60, is composed of a pair of superposed longitudinally interconnected tube members 62 and 64. The inside diameter of the tube 62 is preferably such that it will frictionally surround the cord 12. The wall of the tube 62 is longitudinally slit or cut, as at 66, so that the tube may be opened to receive the cord 12 therein. The size of the other tube 64 is similar to that disclosed for the guard 30. Similarly the tube 64 is provided with the opening 36 and fishhook locks 38. Alternatively the tube 62 may be transversely cut, as at 68, medially its ends and the opposing end portions thus formed slit in opposition to each other adjacent their juncture with the tube 64 as shown at 70 and 72, FIGS. 12 and 13, respectively. Forming the guard 60 in this manner prevents accidental removal of the guard from contact with the cord 12. It seems obvious that a guard 60 formed in this manner may be similarly attached, by the tube member 62, to a fishing pole or rod, not shown, for use in guarding the barbs of a fishhook or fishhooks attached to the fishing line. FIGURE 14 illustrates an alternative form of the guard 60 similarly formed to define juxtaposed bores 62A and 64A. A longitudinal slit or cut 76 extends through the wall area to provide communication between the bores 62A and 64A. Thus, the cord 12 may be easily inserted through the guard bore 64A and thereafter moved into the guard bore 62A through the slit 76. The diameter of the bore 62A is preferably such that it frictionally surrounds the cord 12. Any lateral pull on the guard, by a connected fishhook, tends to maintain the guard walls forming the slit 76 in juxtaposition.

As illustrated in FIG. 15 the fishhook guard may be a rectangular hollow casing or tube 80 to guard a plurality of fishhooks and align their leaders. In this embodiment one end wall of the casing 80 is longitudinally slit, as at 82, and intersected by circular apertures 84 in a manner similar to that described for the guard 50. Alternatively the slit and apertures may be positioned at an angle of 45° with respect to the longitudinal axis of the casing as at 82A. The fishhooks 16 are similarly inserted into the desired one of the apertures 84 and the leader 14 is extended toward and is frictionally held at the opposite end edge of the casing 80 by inserting the leader into a slit cut into the casing end wall and indicated by the lines 86. A diagonal slot or opening 88 is cut through the wall of the casing 80. The slot 88 communicates with a plurality of similarly formed fishhook locks and provides a series of graduated lengths or spacings between the respective locks and the leader gripping end portion of the casing 80 for receiving and holding fishhooks having different lengths of leaders.

FIGURE 16 illustrates a trotline reel 90 particularly adaptable for use with a trotline employing the guards 20, 30, 50 or 60. The reel 90 is formed from a plank, or the like, having V-shaped notches 92 cut in its opposing ends around which the trotline 10 is wound. Pairs of handles 93–94 and 95–96 project oppositely outward from the respective side edges of the reel at its respective ends while a third pair of handles 97–98 are connected to opposing side edges of the reel medially its ends. The trotline may be wound on the reel 90 by manually grasping diagonally opposite ones of the end handles, for example, the handles 93 and 96 and then rotating the reel about its transverse axis. Unwinding the trotline 10 is accomplished by tying the free end thereof to a support, not shown, grasping the medial pair of handles 97–98 and simply allowing the reel to rotate about the axis formed by the handles 97–98 as the fisherman moves away from the connected end of the trotline.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A fishhook guard for a fishing line having a fishhook equipped leader attached thereto, comprising: a tube formed of pliable material, having one end portion surrounding the fishing line and having a length at least as great as the fishhook on the fishing line and having an inside diameter greater than the diameter of the fishing line, said fishing line having a knot frictionally contacting a portion of the inside wall area of said tube, said tube having a slit in its wall for receiving and releasing the barbed end portion of a fishhook, said tube having a circular opening in its wall in communication with the slit, said circular opening being of a size for snugly surrounding a portion of a fishhook intermediate the ends of the latter, whereby a fishhook may be manually pulled through the slit to position the fishhook within the said circular opening; and means frictionally connecting said tube to said fishing line.

2. Structure as specified in claim 1, and said fishing line having at least two spaced-apart knots frictionally contacting a portion of the inside wall of said tube for forming a float.

3. Structure as specified in claim 2, and said tube having a pair of spaced-apart V-shaped notches formed in its wall at its other end portion for slidably directing the fishing line outwardly of and back into the tube.

4. Structure as specified in claim 1, and said tube having a pair of V-shaped notches formed in its wall for slidably receiving the fishing line therethrough.

References Cited by the Examiner

UNITED STATES PATENTS 2,762,155  9/1956  Cothern _____ 43—43.15 X
2,952,206  9/1960  Becksted _____ 24—129 X SAMUEL KOREN, *Primary Examiner.*

D. J. LEACH, *Assistant Examiner.*